US010196935B2

United States Patent
Deane et al.

(10) Patent No.: US 10,196,935 B2
(45) Date of Patent: Feb. 5, 2019

(54) HALF-SPOOLIE METAL SEAL INTEGRAL WITH TUBE

(71) Applicant: General Electric Company, Schenectady, NY (US)

(72) Inventors: Eric Ryan Deane, Somerville, MA (US); Jonathan K. Remer, Saughs, MA (US); Jacob Allen Seal, Pittsburgh, PA (US)

(73) Assignee: General Electric Company, Schenectady, NY (US)

( * ) Notice: Subject to any disclaimer, the term of this patent is extended or adjusted under 35 U.S.C. 154(b) by 859 days.

(21) Appl. No.: 14/396,223

(22) PCT Filed: Apr. 18, 2013

(86) PCT No.: PCT/US2013/037069
§ 371 (c)(1),
(2) Date: Oct. 22, 2014

(87) PCT Pub. No.: WO2013/162982
PCT Pub. Date: Oct. 31, 2013

(65) Prior Publication Data
US 2015/0377065 A1    Dec. 31, 2015

Related U.S. Application Data

(60) Provisional application No. 61/639,361, filed on Apr. 27, 2012.

(51) Int. Cl.
*F01D 9/06*      (2006.01)
*F01D 25/18*     (2006.01)
*F01D 25/26*     (2006.01)

(52) U.S. Cl.
CPC ............ *F01D 25/183* (2013.01); *F01D 9/06* (2013.01); *F01D 9/065* (2013.01); *F01D 25/26* (2013.01); *Y02T 50/671* (2013.01)

(58) Field of Classification Search
CPC ............ F10D 9/065; F10D 25/183; F10D 9/06
See application file for complete search history.

(56) References Cited

U.S. PATENT DOCUMENTS

| 2,936,999 | A | * | 5/1960 | Jacobus | F01D 9/065 384/441 |
| 3,312,448 | A | | 4/1967 | Huil, Jr. et al. | |
| 4,167,097 | A | * | 9/1979 | Wosika | F01D 9/065 415/207 |
| 4,183,207 | A | * | 1/1980 | Libertini | F01D 9/065 184/6.11 |
| 4,802,679 | A | * | 2/1989 | Chen | F01D 9/06 277/637 |

(Continued)

FOREIGN PATENT DOCUMENTS

| CA | 2940064 A1 * | 2/2017 | ............... F01D 9/06 |
| CN | 1294250 A | 5/2001 | |

(Continued)

OTHER PUBLICATIONS

Unofficial English Translation Japanese Office Action issued in connection with corresponding JP Application No. 2015509029 dated Oct. 6, 2015.

(Continued)

*Primary Examiner* — David Bochna
(74) *Attorney, Agent, or Firm* — General Electric Company; William Andes (57) ABSTRACT

A spoolie for sealing a tube passing through an air gap or other interruption within a high temperature operating environment. The apparatus and method allow for a sealing service pathway between areas of differential temperature while allowing for relative movement consistent with thermal expansion and contraction.

13 Claims, 4 Drawing Sheets

(56) References Cited

U.S. PATENT DOCUMENTS

| | | | |
|---|---|---|---|
| 5,593,274 A | | 1/1997 | Carreno et al. |
| 5,628,617 A | * | 5/1997 | Dalton ................ F01D 9/06 |
| | | | 415/134 |
| 6,102,577 A | * | 8/2000 | Tremaine ............ F01D 9/065 |
| | | | 415/112 |
| 6,237,338 B1 | | 5/2001 | Magoshi et al. |
| 6,672,070 B2 | | 1/2004 | Bland et al. |
| 7,530,233 B2 | | 5/2009 | Milazar |
| 7,540,707 B2 | | 6/2009 | Dervaux et al. |
| 8,038,386 B2 | | 10/2011 | Duchatelle et al. |
| 8,123,465 B2 | | 2/2012 | Largillier et al. |
| 8,162,593 B2 | | 4/2012 | Guimbard et al. |
| 2006/0216140 A1 | * | 9/2006 | Dervaux ............. F01D 9/065 |
| | | | 415/115 |
| 2009/0079185 A1 | * | 3/2009 | Carbines-Evans ...... F01D 9/065 |
| | | | 285/123.1 |
| 2009/0155052 A1 | * | 6/2009 | Largillier ........... F01D 9/065 |
| | | | 415/115 |
| 2011/0085895 A1 | * | 4/2011 | Durocher ........... F01D 9/065 |
| | | | 415/178 |
| 2011/0089266 A1 | | 4/2011 | Stoia et al. |
| 2011/0214886 A1 | | 9/2011 | Orr |
| 2012/0318528 A1 | | 12/2012 | Wolfe et al. |
| 2013/0189071 A1 | * | 7/2013 | Durocher ........... F01D 9/065 |
| | | | 415/1 |
| 2014/0123647 A1 | * | 5/2014 | Nakazawa .......... F01D 9/06 |
| | | | 60/657 |

FOREIGN PATENT DOCUMENTS

| | | | | |
|---|---|---|---|---|
| CN | 1392331 A | | 1/2003 | |
| CN | 101560890 A | | 10/2009 | |
| EP | 1052375 A2 | | 11/2000 | |
| EP | 1621734 A1 | | 2/2006 | |
| EP | 1705340 A2 | | 9/2006 | |
| EP | 1947364 A1 | | 7/2008 | |
| EP | 1972756 A1 | | 9/2008 | |
| EP | 2071130 A1 | | 6/2009 | |
| EP | 3045682 A1 | * | 7/2016 | ............ F01D 9/065 |
| FR | 3036437 A1 | * | 11/2016 | ............ F01D 9/065 |
| JP | 5133243 A | | 3/1976 | |
| JP | 0913902 A | | 1/1997 | |
| JP | 1122413 A | | 1/1999 | |
| JP | 2004156623 A | | 6/2004 | |
| JP | 2004293353 A | | 10/2004 | |

OTHER PUBLICATIONS

Unofficial English Translation of Chinese Office Action issued in connection with corresponding CN Application No. 201380021825.5 dated May 6, 2015.

International Search Report and Written Opinion issued in connection with corresponding PCT Application No. PCT/US2013/037069 dated Sep. 16, 2013.

* cited by examiner

HALF-SPOOLIE METAL SEAL INTEGRAL WITH TUBE

CROSS-REFERENCE TO RELATED APPLICATIONS

This application claims priority to and benefit under 35 U.S.C. § 119(e) to U.S. Provisional Patent Application Ser. No. 61/639,361 filed Apr. 27, 2012, in the name of the present inventors, this provisional application being incorporated herein by reference.

BACKGROUND

The present embodiments relate generally to apparatuses and methods for providing a service path through and sealing between structural members within a turbine engine. More specifically, but not by way of limitation, present embodiments relate to apparatuses and methods for providing a sealed service pathway between the bosses within a turbine engine while still allowing relative movement between thermally isolated structural members.

In the turbine engine, air is pressurized in a compressor and mixed with fuel in a combustor for generating hot combustion gases which flow downstream through turbine stages. These turbine stages extract energy from the combustion gases. A high pressure turbine includes a first stage nozzle and a rotor assembly including a disk and a plurality of turbine blades. The high pressure turbine first receives the hot combustion gases from the combustor and includes a first stage stator nozzle that directs the combustion gases downstream through a row of high pressure turbine rotor blades extending radially outwardly from a first rotor disk. In a two stage turbine, a second stage stator nozzle is positioned downstream of the first stage blades followed in turn by a row of second stage turbine blades extending radially outwardly from a second rotor disk. The stator nozzles turn the hot combustion gas in a manner to maximize extraction at the adjacent downstream turbine blades.

The first and second rotor disks are joined to the compressor by a corresponding rotor shaft for powering the compressor during operation. The turbine engine may include a number of stages of static air foils, commonly referred to as vanes, interspaced in the engine axial direction between rotating air foils commonly referred to as blades. A multi-stage low pressure turbine follows the two stage high pressure turbine and is typically joined by a second shaft to a fan disposed upstream from the compressor in a typical turbo fan aircraft engine configuration for powering an aircraft in flight.

As the combustion gasses flow downstream through the turbine stages, energy is extracted therefrom and the pressure of the combustion gas is reduced. The combustion gas is used to power the compressor as well as a turbine output shaft for power and marine use or provide thrust in aviation usage. In this manner, fuel energy is converted to mechanical energy of the rotating shaft to power the compressor and supply compressed air needed to continue the process.

In oil sump subassemblies, for example, of turbine engines, air gaps must be provided to compensate for thermal stresses and operating loads of the turbine engine. However, various pathways and passages are formed within the subassembly members for services such as pressurized air, cooling air, oil flow and others. Some of these frame member subassemblies have boss features adjacent the air gaps. The air gaps create areas of leakage hindering the services of the turbine engine.

For example, hot sumps may utilize contain service tubes that bridge between radially inner and outer walls of the subassembly members. Due to the high temperatures and thermal stresses in this area of the engine, often times these outer walls, inner walls and tubes need to be thermally isolated from one another.

An apparatus is needed which allows use of a service tube to seal across two regions of temperature and/or pressure differential, for example between a hot outer wall and a cooler inner wall while maintaining a thermally isolated system.

As may be seen by the foregoing, there is a need a service tube which may be sealed to create a path across a gap. Additionally, there is a need to provide for relative movement within the system due to thermal growth or expansion of members at different rates.

SUMMARY

The present disclosure involves an apparatus and method of sealing a single tube passing through an air gap to create a service path between regions of air temperature differential. The structure includes a spoolie engaging a tube sealing service pathway at one end of the tube. At a lower end of the tube, a seal seals the tube. Although the tube extends across an air gap, the service path through the tube remains sealed. Further, thermal growth and relative motion of the system may still occur in the hot environment of the turbine engine. The half spoolie metal seal with integral tube concept reduces part count and overall system weight.

All of the above outlined features are to be understood as exemplary only and many more features and objectives of the various embodiments may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of exemplary embodiments, and the manner of attaining them, will become more apparent and the half-spoolie metal seal with integral tube will be better understood by reference to the following description of embodiments taken in conjunction with the accompanying drawings, wherein.

DETAILED DESCRIPTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present embodiments cover such modifications and variations as come within the scope of the appended claims and their equivalents.

Referring now to FIGS. 1-5, present embodiments apply to a gas turbine engine, for example with aviation, power generation, industrial or marine, in which a combustor burns fuel and discharges hot combustion gas into a high pressure turbine. The instant embodiments involve structures and method for sealing a service tube passing through an air gap separating areas of differing air characteristics, for example high temperature differential such as arelatively higher-temperature operating environment from a relatively lower-temperature environment. The structure allows for a metal seal at a higher operating temperature area of the assembly while providing an O-ring or other lower temperature type seal at the opposite area of the assembly. More specifically, the structures and apparatuses allow for a sealed service pathway between areas of differential temperature while allowing for relative movement consistent with thermal expansion and contraction in high temperature service areas.

The terms fore and aft are used with respect to the engine axis and generally mean toward the front of the turbine engine or the rear of the turbine engine in the direction of the engine axis.

As used herein, the terms "radial" or "radially" refer to a dimension extending between a center longitudinal axis of the engine and an outer engine circumference. Alternatively, the term radial or radially may refer to a dimension between or along the line of a center longitudinal axis and outer circumference of the service tube. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

Figure 1:
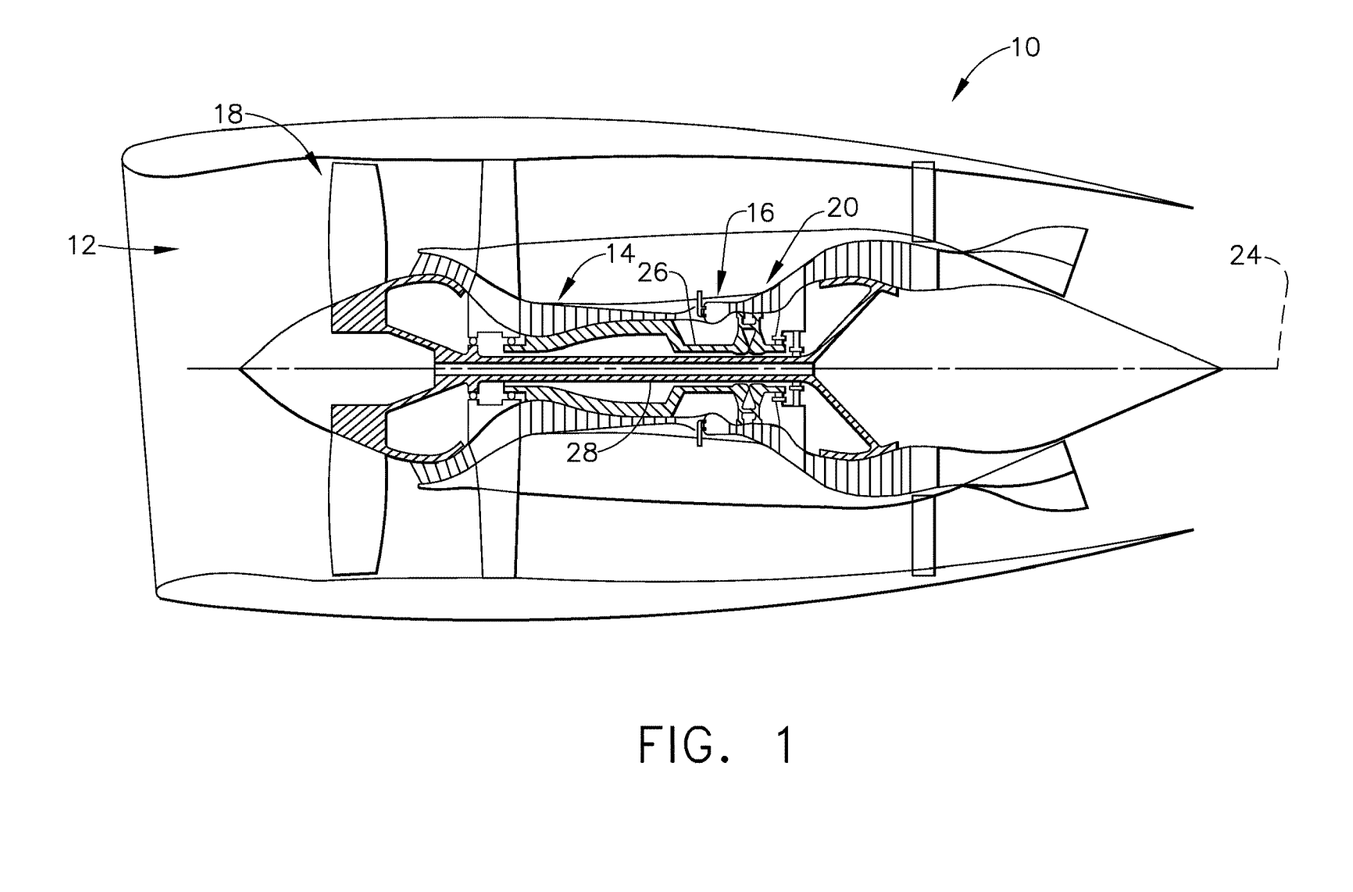
FIG. 1 is a section view of a turbine engine.

Referring initially to FIG. 1, a schematic side section view of a gas turbine engine 10 is shown having an engine inlet end 12, a compressor 14, a combustor 16 and a multi-stage high pressure turbine 20. The gas turbine 10 may be used for aviation, power generation, industrial, marine or the like. The gas turbine 10 is axis-symmetrical about engine shaft 26 or axis 24 so that the components rotate thereabout. In operation, air enters through the air inlet end 12 of the engine 10 and moves through at least one stage of compression 14 where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades, which in turn cause rotation of the high pressure shaft 26. The shaft 26 passes toward the front of the engine to continue rotation of the one or more compressors 14. A second low pressure shaft 28 may extend co-axially through the high pressure shaft 26 to a turbo fan 18 or inlet fan blades, depending on the turbine design.

The axis-symmetrical shaft 26 extends through the through the turbine engine forward end to an aft end and is supported by bearings along the length of the shaft structure. The shaft rotates about a centerline 24 of the engine. During operation the shaft 26 rotates along with other structures connected to the shaft such as the rotor assemblies of the turbine in order to create power or thrust for various types of turbines used in power, industrial or aviation areas of use. The shaft 26 is supported by these bearings which operate in oil sumps to cool and lubricate parts during the high speed revolution.

Fluid leakage in a turbine engine may significantly increase fuel consumption and reduce engine efficiency resulting in undesirable operating parameters. Additionally, high pressure gasses, such as combustion gasses within the turbine and compressor discharge area, may leak from high pressure areas to low pressure areas and controlling such leakage is preferred. Control or inhibition of such leakage is performed in a variety of manners including, for example, labyrinth seals and brush seals positioned between areas of differential pressure. Another area where leakage may occur is in the areas where parts are thermally isolated or separated but where service pathways must pass through. In these areas, the pathways are difficult to seal.

Figure 2:
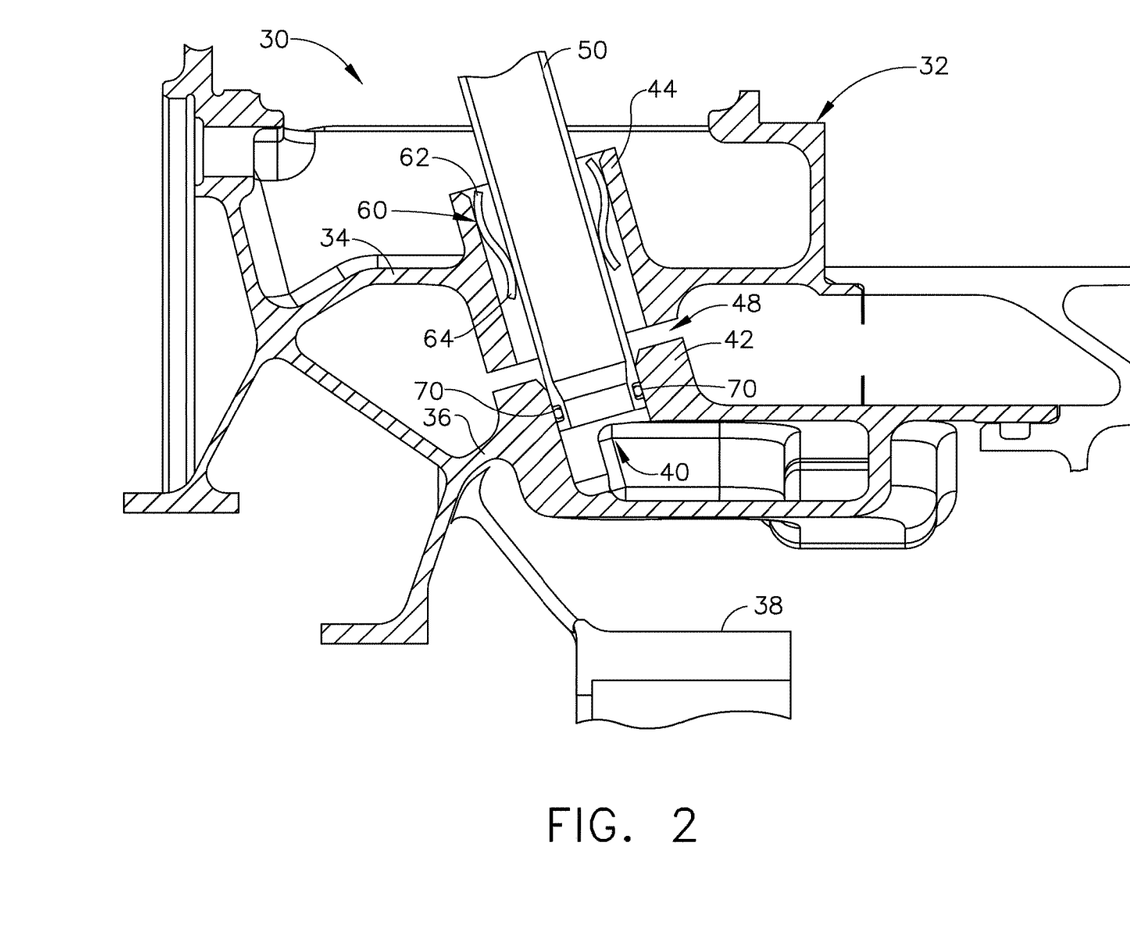
FIG. 2 is a detailed view of an exemplary sump assembly member having the spoolie metal seal with integral tube therein section view of an exemplary sump assembly member.

Referring now to FIG. 2, a side section view of an exemplary oil sump area 30 is shown. The sump area 30 generally operates in extremely high temperature environment and may use pressurized air or pressure differential to collect and move used lubrication back to a reservoir or tank. The sump area 30 may be defined by one or more sump frame members 32. These are generally annular structures which provide a plurality of service passageways or pathways for different services, such as pressurized air, cooling air, oil or other lubricants and the like. The sump frame member 32 may be formed of multiple annular walls including a radially outer wall 34 and a radially inner wall 36, for example. The sump frame member 32 further includes a bearing mount 38. This part is shown for aid in locating surrounding structure of the sump area 30 and for purpose of understanding the exemplary use. It should be understood that the spoolie with integral seal tube may be used in alternate assemblies and locations and therefore the usage described is not limiting. Alternatively stated, the present embodiments may be utilized in various environments wherein a sealed pathway is needed between a first air mass and a second air mass having divergent characteristics including temperature differential, pressure differential, moisture content differential or combinations thereof.

In certain areas of the sump frame member 32 additional passageways may be necessary to guide services between the radially inner and outer walls 34, 36. For example, the member 32 includes a service passage 40 extending between the parts. The service passage 40 includes a first, inner boss 42 at a radially lower end and a second, outer boss 44 at an upper end of the service passageway 40. An air gap 48 is positioned between the lower boss 42 and upper boss 44 for thermal separation of the upper and lower bosses 44, 42. At preselected angular positions of the sump frame 32, there may be a desire to provide a service passage between the inner wall 36 and the outer wall 34. However, one skilled in the art will understand that due to the temperature differentials in this area of the turbine engine 10, the structure connecting the inner wall and outer wall must include an air gap 48 to allow for thermal expansion, thermal isolation between hot services and relatively cold services and or load issues.

The structure includes a service tube 50 which is positioned between the two bosses 42, 44 to provide a service path which is sealed and in fluid communication with the passage 40. The tube 50 is utilized since the air gap 48 would otherwise allow leakage of a service fluid passing through passage 40.

Figure 3:
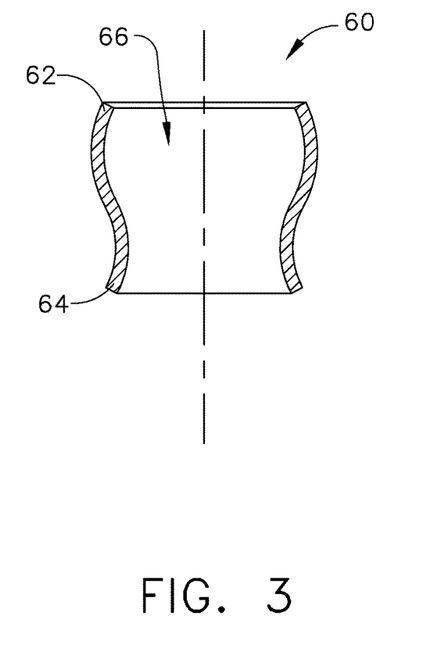
FIG. 3 is a side section view of an exemplary half spoolie.

At the upper end of the service tube 50 is a spoolie 60. With reference briefly to FIG. 3, the spoolie 60 may be generally spherical and hollow to allow tube 50 to pass therethrough. The spoolie 60 has an upper end 62 and a lower end 64 and has a curvilinear shape therebetween. The spoolie 60 is metallic and such material is required due to higher operating temperature at the upper boss 44. Other types of seals may not function properly at the high temperatures seen at the upper boss 44.

The spoolie 60 may be brazed near the lower end 64 to the tube 50 and is press fit or interference fit in the upper boss 44. In this configuration, the upper end of the structure 62 engages the pathway and creates a seal. According to alternative embodiments, the spoolie 60 is brazed or welded to the upper boss 44 and generally allows the service tube 50 to slide through the body of the spoolie. According to alternate embodiments, the spoolie 60 may be movably engaging the boss 44 and the tube 50. The spoolie 60 engages the service tube 50 in, for example, an interference fit. In such circumstance, the interference would occur with the service tube 50 and the lower end 64 of the spoolie 60. Alternatively, the spoolie may be brazed or welded to the service tube 50.

At the lower end of the service tube 50 the lower boss 42 is sealed relative to the service tube 50 by a seal, for example an O-ring 70. The O-ring 70 may be elastomeric, rubber, plastimeric or other forms capable of withstanding the operating temperatures in the area of use. The O-ring 70 may be used at the lower boss 42 because of lower operating temperatures which allow for this type of seal rather than requiring a metal seal structure. Additionally, metal seals may be used where warranted.

From the structure shown, one skilled in the art will understand that the service passage 40 remains sealed by way of the O-ring 70 and the spoolie 60. However relative movement between the tube 50 and the bosses 42, 44 may occur as well as between the bosses 42, 44 themselves.

The half spoolie metal seal with integral tube 60, 50 reduces part count and overall system weight as it may be used in some circumstances to replace a piston ring metal contact seal. The high operating temperature inhibits the use of elastomeric seal and necessitates use of the metal sealing surfaces of the spoolie while still allowing for misalignment capabilities, thermal expansion and mechanical movement.

According to additional embodiments, the spoolie 60 may be welded or brazed to both the tube 50 and the upper boss 44. Also, the terms upper and lower should not be considered limiting as they are used merely as descriptors. The tube 50 may have the spoolie 60 at the one location and O-ring 70 at the other location depending on where temperature extremes are located. The locations may or may not be ends and may not even be upper or lower if the structure is mounted in a horizontal configuration.

Figure 4:
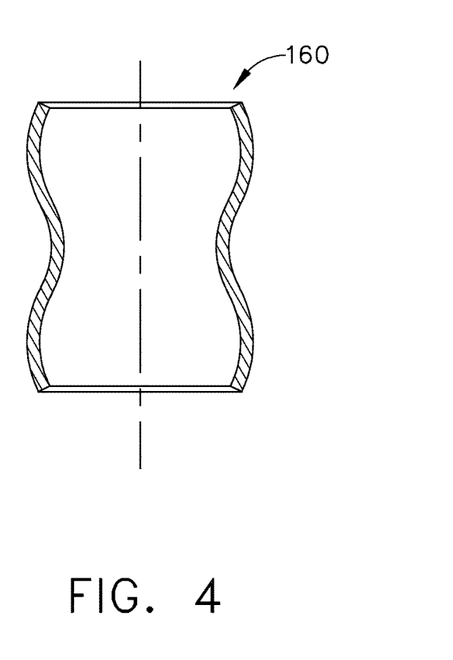
FIG. 4 is a section view of an exemplary full spoolie.

Additionally, referring to FIG. 4, a further alternative is shown wherein a spoolie 160 is a double spherical structure. The spoolies 60, 160 therefore indicate various shapes may be utilized which may be welded and interference or friction fit to create a seal across an open area. The sealed structure therefore allows creation of pathway for services across an otherwise unsealed area and further allows compensation for temperature differentials created expansion and movement concerns in high temperature environments, large temperature differentials or mechanical movement.

Figure 5:
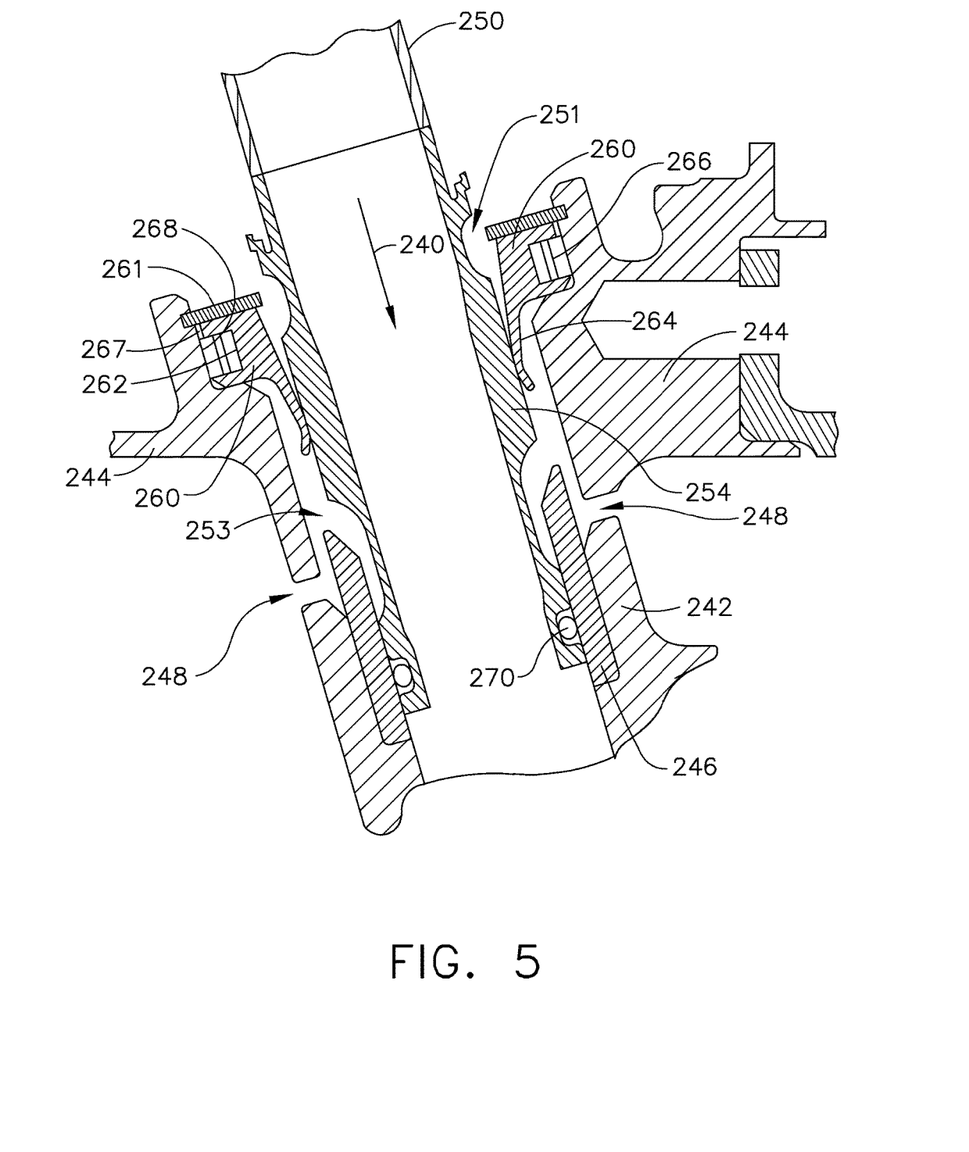
FIG. 5 is a side section view of an alternate embodiment of a spoolie metal seal with integral tube.

Referring now to FIG. 5, a side section view of an alternate embodiment of a spoolie with integral tube is depicted. A service tube 250 extends between an upper housing including boss 244 and a lower housing including boss 242 defining service pathway 240. The service tube 250 may be of a single diameter moving through the tube or may be formed of two or more varying diameters depending on the location of the tube 250. The upper boss 244 is in a portion of the frame exposed to relatively high pressure and/or high temperature operating conditions whereas the lower boss 242 is exposed to relatively lower temperature and/or lower pressure operating conditions associated with the an oil sump, for example. One skilled in the art should realize that high-low temperature differential environments are merely one exemplary situation, however it should be understood that the embodiments may be used across low— very low temperature zones. The service path through the tube 250 may allow flow communication for drainage of oil to the sump. Although the embodiment is described in the context of a downstream oil sump, the structure may be utilized at various locations of an engine to bridge between and create a service path between a high temperature and/or pressure area and a lower temperature and/or low pressure operating area. The service tube 250 includes an upper relief 251 and a lower relief 253. The upper and lower reliefs 251, 253 create clearance areas wherein the service tube 250 may slide in an axial direction of the tube 250 relative to stationary parts without creating undesirable interferences or engagements. Extending between the upper relief and lower reliefs 251, 253 is a seal interface 254. The interface may be a thickened portion of the tube 250 as depicted or may be defined by an annular flange, for example where it may be desirable to reduce weight. The service tube 250 is designed to move in the axial direction, of the tube 250, between the upper boss 244 and the lower boss 242. The service tube 250 is also designed to allow some limited movement radially relative to the tube 250, or generally left to right and vice versa in the figure. The service tube 250 may also allow for rotation about the axis of the service tube 250.

At the upper portion of the service tube 250 is a spoolie 260. The spoolie 260 is annular and surrounds the tube 250. The terms upper and lower are relative descriptors and are generally defined as relative to air gap 248. Portions of the tube 250 above the air gap 248 are generally referred to as upper portions and portions of the tube generally below the air gap 248 are generally defined as relatively lower. The spoolie 260 engages the seal interface 250 by extending inwardly toward the interface 254. Specifically, the spoolie 260 includes a spoolie arm 264 which has a spring effect to engage and maintain engagement with the seal interface 254. An upper portion of the spoolie 260 includes a piston channel 262 wherein a piston ring 266 is seated. Adjacent the upper end of the spoolie 260 is a gap 267 disposed between wall 268 and the spoolie 260. This gap or tolerance 267 allows for movement of the spoolie 260 perpendicular to the axis of the service tube 250. Above the piston channel 262 is a snap ring 261 which is seated in boss 244 or more generally in the upper housing. The spoolie 260 includes a spoolie arm 264 extending toward the seal interface 254. The arm 264 may extend linearly or may extend in curvilinear fashion and may be formed of one or more segments. The lower portion of the spoolie arm is of a thinner dimension than the upper portion of the spoolie 260 which lends to the spring effect and provides for some tolerance during thermal expansion of the boss 244 while maintaining the seal between the service tube 250 and the spoolie 260. The spoolie arm 264 may be interference fit according to some embodiments with the seal interface 254 or alternatively may be brazed to the service tube 250.

Moving downwardly the along the tube 250, the lower relief 253 allows for axial movement of the tube 250. Axially downward from the lower relief 253 is a seal 270. The seal 270 may take various forms including O-ring, face seal, screw fitting or press-fit fitting, for example. An O-ring seal 270 is depicted and described but should not be considered limiting for this or other embodiments as any of various seals may be used. The O-ring 270 provides a seal while allowing for the axial movement of the tube relative to the boss 242. Disposed between the lower portion of the service tube 250 and the boss 242 is a sleeve 246. The sleeve provides a replaceable wear surface against which the tube 250 may move and the O-ring 270 may seal against. At periodic intervals, it may be desirable to replace the sleeve 246 due to chatter and mechanical wear of the sleeve 246. Accordingly, this is easily provided with a sleeve 246 rather than needing to replace the sump boss 242. The upper end of the sleeve 246 may be tapered to inhibit a limiting interference of the service tube 250 relative to the sleeve 246 during the axial movement of the service tube 250.

The assembly provides a function of isolating high temperature/high pressure areas of the engine from lower temperature/lower pressure areas of the engine and allows use of an O-ring seal to provide sealing service in the cooler portion of the service tube 250. The assembly further provides a fire safety functionality wherein oil leakage around the seal 270 may pass through the air gap 248 and into flow communication with drain circuits of the gas turbine engine. This inhibits oil from catching fire at the high temperature side of the service tube and engine.

According to these embodiments, the service tube and spoolie structure are utilized in a variety of passages or pathways to allow sealed service between two parts which need separation or thermal isolation to compensate for thermal growth or where other relative movement is required.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03

What is claimed is:

1. A spoolie metal seal with integral tube comprises:
    a service tube comprising a first portion and a second portion, said service tube extending across an air gap and defining a service path between relatively higher temperature services and relatively lower temperature services;
    a seal disposed about said service tube closer to said relatively lower temperature service; and,
    a spoolie seal engaging an annular surface of said service tube, said spoolie seal engaging said service tube closer to said higher temperature service;
    said spoolie seal being a double spherical structure or further comprising a piston ring engaging said spoolie seal.

2. The spoolie metal seal with integral tube of claim 1, said service tube being of constant diameter.

3. The spoolie metal seal with integral tubes of claim 1, said service tube being of at least first and second diameters.

4. The spoolie metal seal with integral tubes of claim 1, said spoolie seal being substantially hollow and allowing said service tube to pass through said spoolie seal.

5. The spoolie metal seal with integral tubes of claim 4, said spoolie seal having a curvilinear shape.

6. The spoolie metal seal with integral tube of claim 4, said spoolie including a spoolie arm having at least a portion which is linearly extending toward said service tube.

7. The spoolie metal seal with integral tube of claim 6 further comprising an extension from said linearly extending portion.

8. The spoolie metal seal with integral tube of claim 1, said spoolie seal being a half spoolie metal seal.

9. The spoolie metal seal with integral tube of claim 1, said spoolie seal brazed to said service tube.

10. A spoolie metal seal with integral tube comprises:
a service tube comprising a first portion and a second portion, said service tube extending across an air gap and defining a service path between relatively higher temperature services and relatively lower temperature services;
a seal disposed about said service tube closer to said relatively lower temperature service; and,
a spoolie seal engaging an annular surface of said service tube, said spoolie seal engaging said service tube closer to said higher temperature service;
said seal having a slidable interference fit with said service tube, or said seal being an o-ring, or said seal being one of a screw on fitting, a press fitting or a face seal.

11. A spoolie metal seal with integral tube, comprising:
a service tube capable of positioning across an air gap, said service tube defining a service path between a relatively higher temperature portion and a relatively lower temperature portion;
said service tube having a first portion corresponding to said higher temperature portion and a second portion corresponding to said lower temperature portion;
an seal disposed on said tube at said second portion; and,
a spoolie seal engaging said first portion of said tube;
said spoolie being a double spherical structure, or being an arm extending radially inwardly relative to said tube with a piston ring retaining said arm.

12. The spoolie metal seal with integral tube of claim 11, said seal engaging a sleeve disposed about said service tube.

13. The spoolie metal seal with integral tube of claim 11, said seal being an O-ring, said O-ring disposed in a groove located along said service tube.

* * * * *